A. MACLACHLAN.
PROCESS OF AND APPARATUS FOR TREATING WASTE ORGANIC SUBSTANCES.
APPLICATION FILED APR. 16, 1918.
1,360,427.
Patented Nov. 30, 1920.
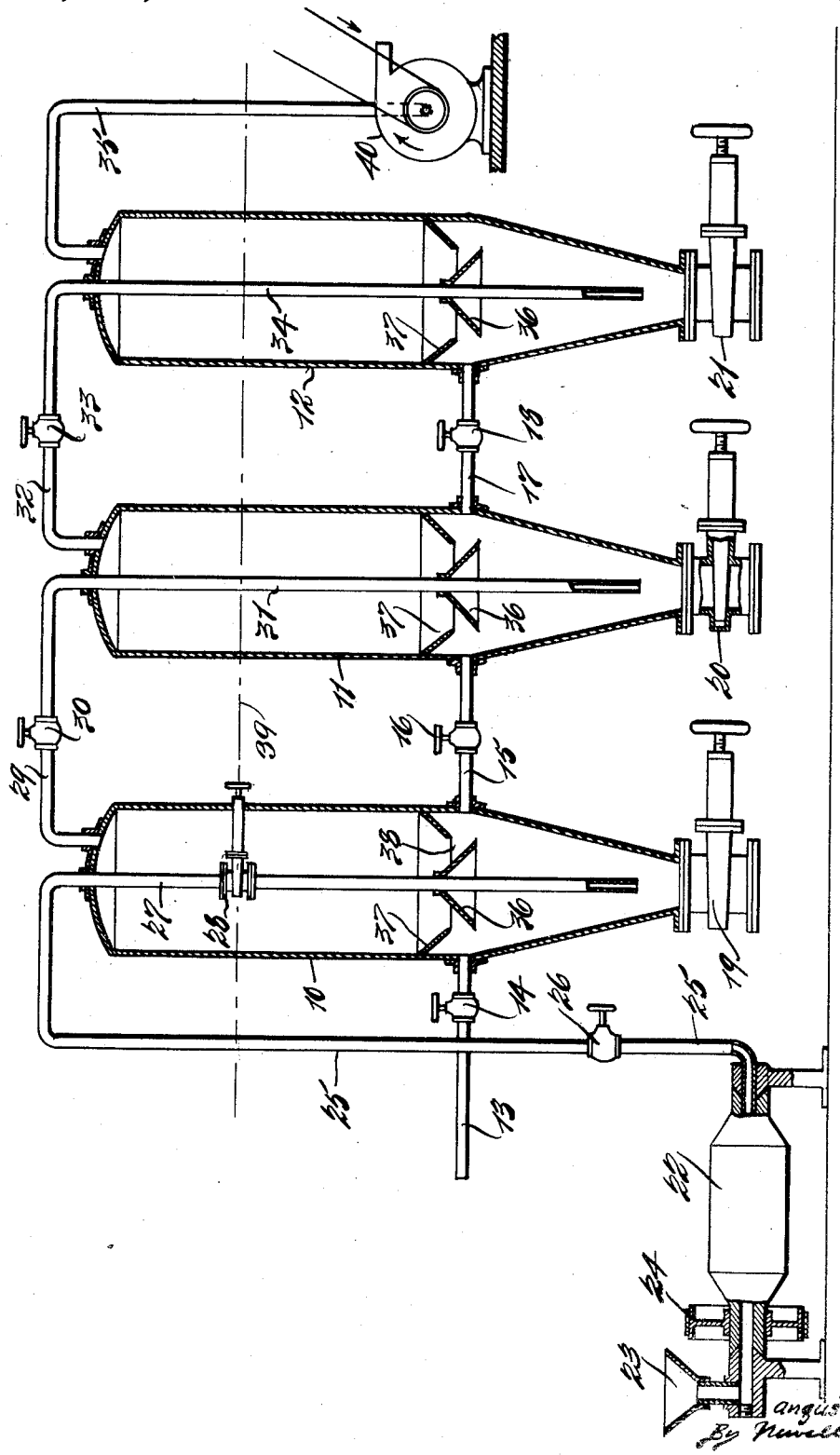

UNITED STATES PATENT OFFICE.

ANGUS MACLACHLAN, OF PITTSBURGH, PENNSYLVANIA, ASSIGNOR OF ONE-FOURTH TO FRED G. REIGART, OF PITTSBURGH, PENNSYLVANIA.

PROCESS OF AND APPARATUS FOR TREATING WASTE ORGANIC SUBSTANCES.

1,360,427.      Specification of Letters Patent.      Patented Nov. 30, 1920.

Application filed April 16, 1918. Serial No. 228,875.

*To all whom it may concern:*

Be it known that I, ANGUS MACLACHLAN, a citizen of the United States, residing at Pittsburgh, Pennsylvania, have invented certain new and useful Improvements in Processes of and Apparatus for Treating Waste Organic Substances, of which the following is a clear, full, and exact description.

This invention relates to processes of and apparatus for treating waste organic substances, with a view to recovering oil or light hydrocarbons, or other liquids therefrom. Another object of the invention is to provide means for the economic treatment of such substances. A still further object is to provide means for assuring that the oxidizing gas which is used will thoroughly permeate the mass of organic substance to be treated.

These being among the objects of the present invention, the same consists of certain process steps and certain features of construction to be hereinafter described and then claimed with reference to the accompanying drawing illustrating one embodiment of the invention, and which is a sectional elevation of a plant provided with the present improvements.

Referring to the drawing, a series of upright receptacles or vessels 10, 11, 12, is shown, and to the lower part of the receptacle 10 there leads a pipe 13 which may conduct the substance to be treated as from a settling tank or other receptacle which may contain sewage-sludge, garbage, etc., adapted to flow through said pipe. The pipe 13 is provided with a valve 14 so that the supply may be controlled or shut off entirely. The process may be carried out in part, at least, in one receptacle such as 10, but it is preferred to employ a series of receptacles 10, 11 and 12, or as many as is desired. The lower parts of the receptacles 10, 11, are connected by a pipe 15 controlled by valve 16, while the receptacles 11, 12, are connected at their lower portions by pipe 17 controlled by valve 18. The said pipes 15 and 17 may be closed entirely, if desired, by closing the valves 16, 18, or said valves may be opened so as to establish communication between the receptacles 10, 11 and 12, thereby permitting the substance that has been introduced into the receptacle 10 to flow successively into the receptacles 11 and 12. The lower ends of the receptacles 10, 11 and 12 are preferably formed contracted as shown, and are provided with suitable valves 19, 20, 21, respectively, for the discharge of substance that has already been treated in said receptacles.

Preferably, sulfurous acid gas is employed as the oxidizing agent, and to that end a source of supply of said gas may be established as from a tank containing liquefied gas, or preferably, and as shown in the drawing, the gas may be manufactured just prior to its introduction into the treating receptacles. To this end a drum 22 is provided, the same having a funnel or hopper 23 leading thereto for the purpose of introducing sulfur into the drum 22, which may be rotated through the medium of a gear 24. The sulfur is burned in this drum in order to throw off sulfurous acid gas which passes into a pipe 25 connected with the outlet end of the drum. The pipe 25 is provided with a valve 26, and said pipe extends upwardly and over and into the first receptacle, in the form of a downwardly extending leg 27, said leg being arranged coincident with the axis of said receptacle. The lower extremity of said leg extends downwardly to a point just above the discharge valve 19, and said leg is provided just below the top of said receptacle with a valve 28. The upper ends of the receptacles 10, 11, are connected by a pipe 29 provided with a valve 30, and the pipe 29 is extended in the form of a leg 31 located in the receptacle 11 and which is similar to the leg 27, except that no valve is necessary. The upper ends of the receptacles 11, 12, are connected by pipe 32 provided with a valve 33, and from the pipe 32 a leg 34 extends downwardly into the receptacle 12, said leg 34 and the pipe 32, together with the valve 33, being substantially similar to the pipe 29, valve 30 and leg 31. From the top of the receptacle 12 there leads a pipe 35 to a vacuum pump 40, which is indicated only diagrammatically.

Arranged in each receptacle 10, 11 and 12 there is a suitable deflecting means intermediate the length of each leg and its receptacle, for the purpose of restricting or directing the path of flow of the gas upwardly in the receptacle. Such means comprises a conical deflector 36, one of which is secured to each of the legs 27, 31 and 34, each deflector being arranged in each receptacle at a point about in line with the substance flow pipes 13, 15 and 17. Slightly above but surrounding each conical deflector 36, there is an inverted frusto-conical deflector 37, which is secured to the inner surface of each receptacle, said deflector 37 being spaced at its lower edge at a distance away from the conical deflector 36 so as to provide an annular throat 38.

The process is carried out as follows: Valves 14, 16 and 18 are opened so that sludge, garbage, or the like waste organic substances may flow into the receptacle 10, then into the receptacle 11, and finally into the receptacle 12, the approximate level of the organic substance in the receptacles being indicated at 39. Before the organic substance to be treated in receptacles is caused to flow, the valves 26, 28, 30 and 33 are closed, and then the pump 40 is set in operation in order to create more or less of a vacuum in the receptacles 10, 11, 12, whereupon the organic substance to be treated is sucked successively through the pipe 13 and into the receptacle 10, through the pipe 15 and into the receptacle 11, and through the pipe 17 and into the receptacle 12. When the receptacles 10, 11 and 12 have been charged with sufficient amount of organic substance, sulfurous acid gas may be admitted after the valves 14, 16 and 18 have first been closed. This is done by opening the valves 26, 28, 30 and 33 and allowing the sulfurous acid gas to flow downwardly through the legs 27, 31 and 34 and into the treating receptacles. An enforced circulation of the gas is brought about by the action of the pump 40, which sucks the same successively through the leg 27 and into the receptacle 10, through the leg 31 and into the receptacle 11 and through the leg 34 and into the receptacle 12. The action in the first receptacle 10 is that the oxidizing gas flows out of the lower end of the leg 27, and due to the partial vacuum in the said receptacle is caused to pass upwardly through the mass of organic substance in the said receptacle 10, the said gas thoroughly permeating the mass, and it is caused to have an intimate contact with the mass through the intervention of the deflecting means 36, 37. It will be seen that the gas is applied to the mass at the center of its lower portion and that it tends to pass upwardly and outwardly through the mass, while when the said gas reaches the deflectors 36, 37, it is caused to take a path toward the interior of the mass through throat 38 and above the deflector 37, and that the gas will then flow upwardly and outwardly into the mass, thereby thoroughly permeating all portions of the mass and oxidizing the organic substances therein. The result is that oils or other liquids are precipitated upon the upper surface of the mass of organic substance being treated, and when the process in the receptacle 10 is completed, the mass of organic substance is thoroughly burned out by the action of the oxidizing gas and may be used for any desired purpose by opening the valve 19 after the process has been completed. The oil or other liquid in the receptacle 10 may be drawn off from above the mass of organic substance, or after the same has been removed through the opening controlled by the valve 19, the oil or other liquid will flow out and can be separately collected from the treated organic substance.

The same process takes place in the receptacles 11 and 12, the only difference being that the surplus only of the sulfurous acid gas from the receptacles 10 and 11, respectively, will flow into the receptacles 11 and 12. After the process has been completed and the treated organic substance and oil or other liquid removed, the apparatus is ready to carry out the process again, but before doing so, and in fact before opening the discharge valves 19, 20 and 21, the valves 28, 30 and 33 should be closed, and the vacuum pump stopped.

If desired, lime may be introduced to neutralize the acid in any well known way.

Obviously the invention is susceptible of modification as will be apparent to those skilled in the art, without departing from the spirit and scope of the invention as expressed in the claims.

What I claim as new is—

1. The process of treating waste organic substances, which consists in subjecting a first mass of said substances to the action of an oxidizing gas applied primarily to the lower portion of said mass, allowing said gas to rise through said mass, subjecting a second mass of said substances to the action of the unspent portion of said gas, and allowing the lighter substances, as oil, to precipitate upon the heavier oxidized substances of said masses.

2. Apparatus for treating waste organic substances, comprising an upright substance receptacle having means for discharging its contents, means for introducing the substance thereinto, a source of oxidizing gas, a pipe leading from said source and having a leg extending axially into said receptacle down to near the lower end thereof so as to discharge said gas into said receptacle at that point, a gas outlet at the top, means for causing a circulation of the gas upwardly through the substance, and deflecting means intermediate of the length of said leg to restrict the path of flow of said gas.

3. Apparatus for treating waste organic substances, comprising an upright substance receptacle having means for discharging its contents, means for introducing the substance thereinto, a source of oxidizing gas, a pipe leading from said source and having a leg extending axially into said receptacle down to near the lower end thereof so as to discharge said gas into said receptacle at that point, a gas outlet at the top, means for causing a circulation of the gas upwardly through the substance, and deflecting means intermediate of the length of said leg to restrict the path of flow of said gas, said deflecting means comprising a conical deflector fixed on said leg and an inverted frusto-conical deflector fixed to said receptacle, and having its lower edge spaced away from said conical deflector to provide an annular throat.

4. Apparatus for treating waste organic substances, comprising a plurality of substance receptacles, each having means for discharging its contents, means for introducing the substance into one of said receptacles, means for imposing a suction directly on another of said receptacles, a valved substance flow pipe connecting the said two receptacles, a source of supply for an oxidizing gas, and valved gas discharge legs, one of said legs connecting directly with said source, and other legs connecting and extending down into said receptacles.

5. Apparatus for treating waste organic substances, comprising a plurality of upright substance receptacles, each having means at the lower end for discharging its contents, means for introducing the substance into one of said receptacles, means for imposing a suction directly on another of said receptacles, a valved substance flow pipe connecting the said two receptacles, a source of supply for an oxidizing gas, and valved gas discharge legs, one of said legs connected directly with said source and other legs connecting and extending down into said receptacles and terminating adjacent the said discharge means.

6. Apparatus for treating waste organic substances, comprising a plurality of upright substance receptacles, each having means at the lower end for discharging its contents, means for introducing the substance into one of said receptacles, means for imposing a suction directly on another of said receptacles, a valved substance flow pipe connecting the said two receptacles, a source of supply for an oxidizing gas, valved gas discharge legs one of said legs connected directly with said source, and other legs connecting and extending down into said receptacles and terminating adjacent to the said discharging means, and deflecting means applied to said legs and said receptacles intermediately of their lengths to restrict the path of flow of said gas.

Signed at Pittsburgh, Penna., this 10th day of April, 1918.

ANGUS MACLACHLAN.